(12) United States Patent
Fattal et al.

(10) Patent No.: US 8,831,653 B2
(45) Date of Patent: Sep. 9, 2014

(54) METHODS AND SYSTEMS FOR CONTROL-CHANNEL RESOURCE ALLOCATION IN MULTI-USER COMMUNICATION SYSTEMS

(75) Inventors: Shahar Fattal, Tel Aviv (IL); Daniel Yellin, Ra'anana (IL); Ronen Mayrench, Ra'anana (IL); Shlomo Shamai, Tel Aviv (IL)

(73) Assignee: Marvell World Trade Ltd., St.Michael (BB)

( * ) Notice: Subject to any disclaimer, the term of this patent is extended or adjusted under 35 U.S.C. 154(b) by 458 days.

(21) Appl. No.: 13/008,917

(22) Filed: Jan. 19, 2011

(65) Prior Publication Data

US 2011/0177835 A1    Jul. 21, 2011

Related U.S. Application Data

(60) Provisional application No. 61/296,765, filed on Jan. 20, 2010.

(51) Int. Cl.
*H04B 15/00* (2006.01)
*H04W 72/08* (2009.01)

(52) U.S. Cl.
CPC .................................. *H04W 72/082* (2013.01)
USPC ........................................ 455/501; 455/63.1

(58) Field of Classification Search
CPC ..... H04L 5/006; H04L 1/0026; H04L 5/0053; H04L 1/0028; H04L 5/0048; H04L 1/0002; H04L 1/1887; H04L 12/1868; H04W 72/0413; H04W 72/085; H04W 28/06; H04W 24/02; H04W 52/08; H04W 52/12; H04W 52/34; H04W 52/60; H04B 7/0626; H04B 7/0862; H04B 7/0632; H04B 7/0673

USPC ............. 455/522, 69, 450, 63.1, 67.11, 501, 455/509, 452.2; 370/328, 329, 344, 347, 370/334, 352, 401, 462, 335, 330, 236, 282

See application file for complete search history.

(56) References Cited

U.S. PATENT DOCUMENTS

| | | | |
|---|---|---|---|
| 7,406,058 B2 * | 7/2008 | Laroia et al. ................... | 370/328 |
| 2003/0096631 A1 * | 5/2003 | Kayama et al. ............... | 455/522 |
| 2005/0276224 A1 * | 12/2005 | Jiang et al. .................... | 370/236 |
| 2007/0259668 A1 | 11/2007 | Legg | |
| 2008/0207135 A1 * | 8/2008 | Varadarajan et al. ........... | 455/69 |
| 2008/0304448 A1 * | 12/2008 | Hosein .......................... | 370/329 |

(Continued)

OTHER PUBLICATIONS

International Application PCT/IB2011/050228 Search Report dated Oct. 31, 2011.

*Primary Examiner* — Golam Sorowar

(57) ABSTRACT

A method in a communication system, in which multiple transmitters transmit respective control messages to a receiver over a control channel, includes allocating respective resources of the control channel to the control messages so as to cause a respective likelihood of interference between a control message and at least one other control message to be inversely related to a respective impact of the interference between the control message and the at least one other control message on an overall performance measure defined for the communication system, by allocating a dedicated resource to a first control message for which the interference has a high impact on the overall performance measure, and allocating a shared resource to a second control message for which the interference has a low impact on the overall performance measure. The control messages are transmitted from the transmitters over the control channel using the allocated resources.

19 Claims, 4 Drawing Sheets

(56) References Cited

U.S. PATENT DOCUMENTS

| | | |
|---|---|---|
| 2008/0316928 A1 | 12/2008 | Yuan et al. |
| 2009/0129366 A1 | 5/2009 | Molisch et al. |
| 2009/0268692 A1* | 10/2009 | Haartsen et al. ............ 370/335 |
| 2009/0323628 A1* | 12/2009 | Cho et al. .................... 370/330 |
| 2010/0255850 A1* | 10/2010 | Kaukoranta et al. ......... 455/450 |
| 2010/0329200 A1* | 12/2010 | Chen et al. .................. 370/329 |

\* cited by examiner

METHODS AND SYSTEMS FOR CONTROL-CHANNEL RESOURCE ALLOCATION IN MULTI-USER COMMUNICATION SYSTEMS

CROSS-REFERENCE TO RELATED APPLICATIONS

This application claims the benefit of U.S. Provisional Patent Application 61/296,765, filed Jan. 20, 2010, whose disclosure is incorporated herein by reference in its entirety.

FIELD OF THE DISCLOSURE

The present disclosure relates generally to communication systems, and particularly to methods and systems for channel resource allocation in multi-user communication systems.

BACKGROUND

In various communication systems, multiple transmitters transmit messages to a single receiver. For example, in some cellular communication systems multiple communication terminals send uplink messages to a base station. Uplink messages may convey, for example, feedback regarding the communication channels between the base station and the communication terminals.

The description above is presented as a general overview of related art in this field and should not be construed as an admission that any of the information it contains constitutes prior art against the present patent application.

SUMMARY

An embodiment that is described herein provides a method in a communication system, in which multiple transmitters transmit respective messages to a receiver over a communication channel. The method includes allocating respective resources of the communication channel to the messages so as to cause, for each message, a respective likelihood of interference between the message and at least one other message to depend on a respective impact of the interference on an overall performance measure defined for the communication system. The messages are transmitted from the transmitters over the communication channel using the allocated resources.

In some embodiments, transmitting the messages includes transmitting feedback indicative of the communication channel, and the overall performance measure includes a performance of the communication system after optimization based on the feedback. In an embodiment, allocating the resources includes causing, for each message, a respective probability of collision between the message and the at least one other message to depend on the respective impact of the collision on the overall performance measure.

In a disclosed embodiment, allocating the resources includes allocating to a first message for which the interference has a high impact on the overall performance measure a first resource that is shared among a first number of the transmitters; and allocating to a second message for which the interference has a low impact on the overall performance measure a second resource that is shared among a second number of the transmitters, larger than the first number.

In another embodiment, allocating the resources includes allocating a dedicated resource to a first message for which the interference has a high impact on the overall performance measure, and allocating a shared resource to a second message for which the interference has a low impact on the overall performance measure.

In yet another embodiment, allocating the resources includes assigning the resources depending on respective occurrence probabilities of the messages. In still another embodiment, allocating the resources includes assigning the resources depending on respective importance measures of the messages. In some embodiment, allocating the resources includes setting, for a given message, at least one transmission parameter selected from a group of parameters including a transmit power, a modulation scheme, a coding scheme and a processing gain used for transmitting the given message.

In a disclosed embodiment, allocating the resources includes assigning the resources for the messages that are available for transmission within a limited optimization time period. In an embodiment, allocating the resources includes coordinating allocation of the resources among the transmitters. In another embodiment, allocating the resources includes segmenting each of at least some of the messages into multiple individually-decodable segments, and allocating the resources to the respective segments. In yet another embodiment, transmitting the messages includes signaling an indication of the transmitted segments to the receiver. In an embodiment, segmenting the messages includes signaling in a given segment whether a subsequent segment is to be transmitted.

There is additionally provided, in accordance with an embodiment that is described herein, a transmitter in a communication system in which multiple transmitters transmit respective messages to a receiver over a communication channel. The transmitter includes a processor and transmission circuitry. The processor is configured to allocate a resource of the communication channel to a message to be transmitted from the transmitter, so as to cause a likelihood of interference between the message and at least one other message transmitted by at least one other transmitter to depend on a respective impact of the interference on an overall performance measure defined for the communication system. The transmission circuitry is configured to transmit the message over the communication channel using the allocated resources. In some embodiments, a mobile communication terminal includes the disclosed transmitter. In some embodiments, a chipset for processing signals in a mobile communication terminal includes the disclosed transmitter.

There is also provided, in accordance with an embodiment that is described herein, a communication system including a receiver and multiple transmitters. The receiver is configured to receive messages over a communication channel. Each transmitter is configured to allocate a respective resource of the communication channel to a respective message to be transmitted by the transmitter, so as to cause a respective likelihood of interference between the message and at least one other message transmitted by at least one other transmitter to depend on a respective impact of the interference on an overall performance measure defined for the communication system, and to transmit the message to the receiver over the communication channel using the allocated resource.

The present disclosure will be more fully understood from the following detailed description of the embodiments thereof, taken together with the drawings in which:

DETAILED DESCRIPTION OF EMBODIMENTS

Figure 1:
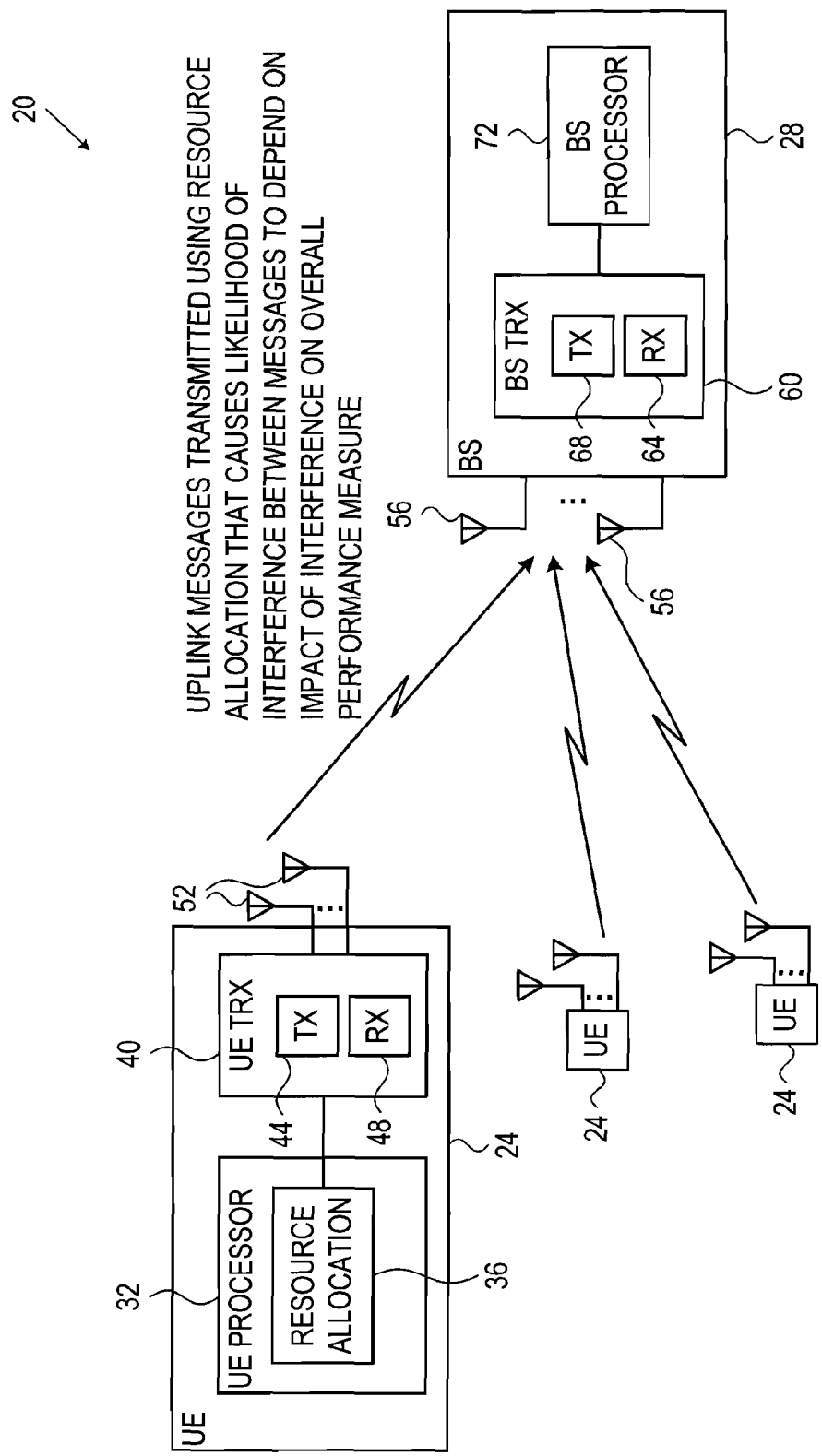
FIG. 1 is a block diagram that schematically illustrates a multi-user communication system, in accordance with an embodiment that is described herein.

Embodiments that are described herein provide methods and systems for improved allocation of channel resources to messages that are sent from multiple transmitters to a common receiver. In a cellular communication system, for example, multiple communication terminals (referred to as User Equipment—UE) send uplink feedback messages to a Base Station (BS). The messages provide feedback regarding the communication channels between the BS and the UEs, and are used by the BS for optimizing downlink transmissions to the UEs.

In some embodiments, each transmitter selects the messages for transmission to the receiver from a predefined set of possible messages. The disclosed techniques allocate channel resources to the messages in a manner that permits some tolerable interference (e.g., collision) between messages of different transmitters, having little or no impact on system performance. As a result, channel resources are allocated with high efficiency. For example, a high number of messages (or larger messages) can be transmitted using limited channel resources, and more channel resources can be assigned to messages whose loss or distortion has a strong impact on system performance. The disclosed allocation schemes, however, ensure that any potential degradation in system performance caused by this interference is kept small.

Typically, each possible message in a given transmitter is allocated a respective channel resource depending on the possible impact of interference between the message and messages of other transmitters (e.g., impact of a loss of the message) on the overall performance of the communication system. This impact is typically measured in terms of an overall performance metric defined for the system. Several examples of performance metrics and corresponding resource allocation schemes are described herein.

Typically, the channel resources are allocated such that the likelihood of interference to a given message is inversely related to the importance of the message (in terms of the overall performance metric) and to the probability of occurrence of the message. Thus, important and/or frequent messages, whose loss or distortion would have a relatively strong impact on system performance, are typically allocated low-interference resources, and vice versa.

In some embodiments, at least some of the messages are allocated resources that are shared between two or more transmitters, thus providing an efficient allocation at the expense of possible collision between messages. The likelihood of collision is controlled, for example, by controlling the number of transmitters among which a given resource is shared. In an example embodiment, high-impact messages (e.g., important and/or frequent messages) are allocated dedicated, collision-free channel resources. Lower-impact messages are assigned resources that are shared between two transmitters, and messages having still lower impact are assigned resources that are shared between larger numbers of transmitters.

In some example embodiments, high-impact messages are transmitted using more robust transmission parameters, such as transmit power, modulation scheme, coding scheme or processing gain, in comparison with low-impact messages.

By using the disclosed techniques, the communication system is able to allocate channel resources efficiently to the different transmitter messages, while minimizing the degradation in system performance. For example, in channel feedback schemes that use these techniques, uplink bandwidth is allocated more efficiently to uplink feedback messages, with little or no effect on the optimization of downlink transmission or on downlink throughput.

The methods and systems described herein can be viewed as joint multi-user compression and multiple access schemes, which achieve efficient channel resource allocation and high system performance. Although the embodiments described herein refer to uplink feedback messages, the disclosed techniques can be used with various other types of messages.

FIG. 1 is a block diagram that schematically illustrates a multi-user communication system 20, in accordance with an embodiment that is described herein. In the present example, system 20 comprises a Long Term Evolution (LTE) system. In alternative embodiments, however, system 20 may operate in accordance with any other suitable multi-user communication standard or specification, such as, for example, LTE-Advanced (LTE-A), Universal Mobile Telecommunications System (UMTS—also sometimes referred to as Wideband Code Division Multiple Access—WCDMA), WiFi or WiMAX.

System 20 comprises multiple UEs 24 that communicate with a BS 28. Although the present example illustrates three UEs and a single BS for the sake of clarity, real-life systems typically comprise a large number of UEs and multiple BSs. System 20 typically applies a certain multiple access scheme for multiplexing the communication with different UEs, such as, for example, Time Division Multiple Access (TDMA), Frequency Division Multiple Access (FDMA) such as Orthogonal Frequency Division Multiple Access (OFDMA), Code Division Multiple Access (CDMA) or Spatial Division Multiple Access (SDMA).

As part of the communication between UEs and BS 28, each UE sends to the BS uplink messages that are indicative of the communication channel or channels between the BS and the UE. (The arrow directions in FIG. 1 refer only to uplink transmission, for the sake of clarity. Generally, however, the UEs and BS conduct bidirectional communication.)

In a Multiple-Input Multiple-Output (MIMO) system, for example, each UE 24 sends feedback for multiple communication channels between the multiple BS and UE antennas, such as Channel State Information (CSI) or Hybrid Automatic Repeat reQuest (HARQ) messages. BS 28 configures the downlink transmissions based on the feedback messages received from the UEs. Configuring the downlink transmission involves, for example, retransmitting downlink messages that were not received with adequate quality, selecting a precoding scheme for precoding the downlink transmission, modifying the transmit power, or any other suitable BS decision that is based on the feedback messages. System 20 uses an efficient scheme of allocating uplink resources to the feedback messages, as will be explained in detail below.

In the embodiment of FIG. 1, each UE comprises a UE processor 32, which manages the operation of the UE and controls the various UE components. UE processor 32 comprises a resource allocation module 36, which allocates uplink channel resources to the feedback messages of the UE, in accordance with the disclosed allocation schemes. A UE transceiver (TRX) 40 comprises a UE transmitter (TX) 44 that transmits the uplink messages to BS 28, and a UE receiver (RX) 48 that receives downlink messages from the BS. The UE transmits and receives using one or more UE antennas 52. FIG. 1 shows the UE structure in detail only for one of the UEs, for the sake of clarity. The other UEs typically have a similar internal structure.

In an embodiment, BS 28 comprises one or more BS antennas 56 used for transmission and reception. A BS TRX 60 comprises a BS RX 64 that receives uplink messages from the UEs, and a BS TX 68 that transmits downlink messages to the UEs. A BS processor 72 manages the operation of the BS and controls the various BS components. In an embodiment, BS processor 72 configures the downlink message transmission based on the uplink messages received from UEs 24.

The BS and UE configurations shown in FIG. 1 are example configurations, which are depicted solely for the sake of clarity. In alternative embodiments, any other suitable BS and UE configurations can also be used. Some UE and BS elements that are not mandatory for understanding of the disclosed techniques have been omitted from the figures for the sake of clarity. The different elements of these units are typically implemented using dedicated hardware, such as using one or more Application-Specific Integrated Circuits (ASICs), Radio frequency Integrated Circuits (RFIC) and/or Field-Programmable Gate Arrays (FPGAs). Alternatively, some elements may be implemented using software executing on programmable hardware, or using a combination of hardware and software elements.

In some embodiments, some or all of the elements of UE 28 may be fabricated in a chip-set. When implementing the disclosed techniques in software on a programmable processor, e.g., in UE processor 32 or in BS processor 72, the software may be downloaded to the processor in electronic form, over a network, for example, or it may, alternatively or additionally, be provided and/or stored on non-transitory tangible media, such as magnetic, optical or electronic memory.

In many practical system configurations, uplink channel resources are limited and should be allocated efficiently. System 20 allocates uplink channel resources to the different feedback messages in a manner that uses the channel resources with improved efficiency, while minimizing the degradation in system performance, as will be explained below.

The term "channel resource" (or simply "resource" for brevity) refers to any suitable part of the communication channel that can be used for transferring information between the UEs and the BS. A given channel resource typically has a respective size, which indicates the number of bits that can be transferred over this resource. The number of bits in a given resource may vary, for example, with transmission scheme, channel conditions and specified error performance (e.g., Block Error Rate—BLER) at the BS receiver.

The specific definition of channel resources may vary from one system to another, for example depending on the specific multiple access scheme used in the system (e.g., TDMA, FDMA, CDMA or SDMA). In LTE uplink, for example, a channel resource may comprise a group of bits that is carried over a set of Single Carrier Frequency Division Multiple Access (SC-FDMA) symbols. In WIMAX uplink, a channel resource may comprise a group of bits that is carried over a set of sub-carriers. In UMTS uplink, a channel resource may comprise a group of bits that is carried over a set of data symbols transmitted over a set of scrambling codes. Alternatively, system 20 may allocate any other suitable channel resource for the uplink feedback messages.

In some embodiments, a certain overall performance metric is defined for system 20. The system allocates channel resources in a way that permits some controlled interference between messages of different transmitters. The allocation is performed such that the probability of interference to a given message depends on the impact of this interference (e.g., loss of the message) on the overall performance metrics defined for the system.

The terms "interference between messages" or "interference to a message" refers to message collision, increase in noise or distortion, degradation in error probability, or any other mechanism that potentially causes full or partial loss of information upon reception of the messages. For example, if two or more messages of different transmitters are allocated the same time-frequency resource, there is some probability that two or more of the transmitters will actually transmit on this resource simultaneously, causing full or partial message collision. As another example, in a CDMA system, if messages are allocated the same time-frequency channel but with different spreading codes, simultaneous transmission of these messages may reduce the Signal-to-Noise Ratio (SNR) during reception, and thus increase the probability of error.

In various embodiments, various distortion measures and/or overall performance metrics are defined. In an example embodiment, BS 28 attempts to optimize the downlink transmission based on the feedback messages received over the uplink. If feedback messages are received with few or no errors, the BS is typically better able to use the feedback to optimize the downlink transmission. If feedback messages are subject to severe interference, the optimization of downlink transmission may be degraded. Thus, in these embodiments, the overall performance metric may comprise the downlink throughput. Alternatively, any other suitable distortion measure and/or overall performance metric can be used.

Let N denote the number of transmitters (in the present example UEs) in system 20. Each transmitter $s \in \{1 \ldots N\}$ selects the feedback messages to be transmitted to the BS in a given transmission from a set of $K_s$ messages denoted $\{M_k^s\}_{k=1}^{K_s}$. The respective a-priori occurrence probabilities of the messages are denoted $\{p_k^s\}_{k=1}^{K_s}$. A distortion measure between the transmitted messages $$\{M_{k_t^s}^s\}_{s=1}^{N}$$

and the received messages $$\{\hat{M}_{k_r^s}^s\}_{s=1}^{N}$$

at the receiver is given by $$f(\{\hat{M}_{k_r^s}^s\}_{s=1}^{N}, \{M_{k_t^s}^s\}_{s=1}^{N}).$$

The disclosed techniques allocate channel resources to the feedback messages of the N transmitters so as to minimize the distortion measure f. Minimizing the distortion measure is equivalent to maximizing some overall performance metric of the system, and the two terms are sometimes used interchangeably herein.

Figure 2:
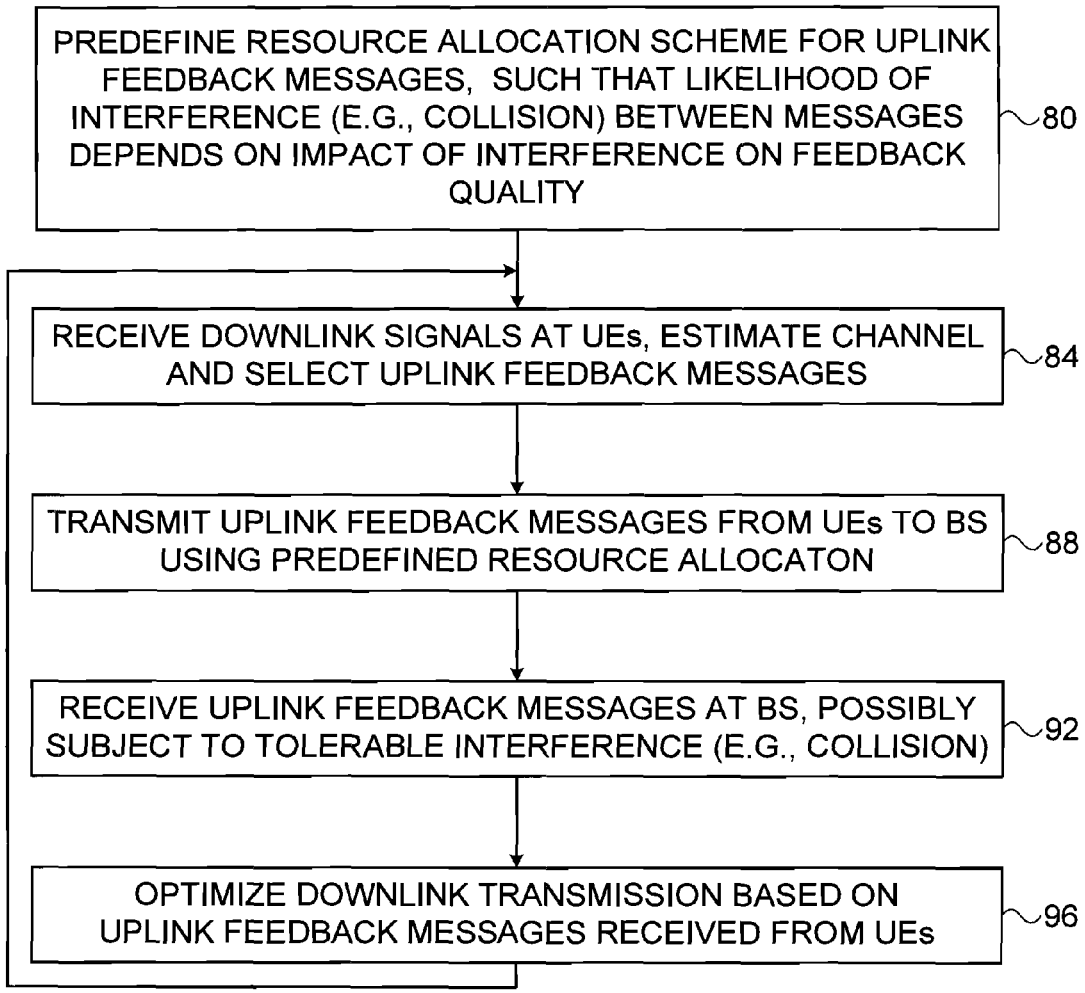
FIG. 2 is a flow chart that schematically illustrates a method for communication in a multi-user communication system, in accordance with an embodiment that is described herein.

FIG. 2 is a flow chart that schematically illustrates a method for communication in a multi-user communication system, in accordance with an embodiment that is described herein. The method begins with defining a resource allocation scheme as explained above for the uplink feedback messages, at a definition operation 80. In the present example, feedback quality (or the resulting downlink throughput) is used as the overall performance metric of system 20.

UEs 24 receive downlink signals from BS 28, at a downlink processing operation 84. Based on the received downlink signals, each UE estimates the communication channel and selects the appropriate feedback message for transmission to the BS. The UEs transmit the selected feedback messages to BS 28 using the predefined resource allocation scheme, at an uplink transmission operation 88.

BS 28 receives the feedback messages from UEs 24, possibly with some tolerable interference, at an uplink reception operation 92. The BS optimizes subsequent downlink transmission to the UEs based on the received feedback messages, at a downlink optimization operation 96. The method then loops back to operation 84 above, in which the BS transmits downlink signals to the UEs following the optimization.

In some embodiments, each feedback message is partitioned into one or more segments, such that each segment is independently decodable by the BS even if other segments of the same message are lost. Each segment is assigned a separate respective channel resource. This sort of segmentation further improves the allocation efficiency. In some embodiments, although not necessarily, the segments comprise inter-segment signaling that inform the BS which segments to decode. In an example embodiment, each segment comprises an indication whether the next segment is used or not. This mechanism relieves the BS of the need to detect which segments were actually transmitted (e.g., by applying blind decoding or energy detection).

In some embodiments, the resource allocation scheme defined different transmission parameters for different messages. Typically, messages whose loss or interference has high impact on the overall performance measure are transmitted with more robust transmission parameters, and vice versa. Setting of transmission parameters in a given UE is typically carried out by resource allocation module 36 in UE processor 32.

Transmission using more robust transmission parameters comprises, in example embodiments, transmitting at higher power, using stronger channel coding (i.e., lower coding rate), using a more robust modulation scheme, on a channel having lower multiple-access noise (e.g., a channel shared among fewer UEs), using a stronger processing gain, or using any other suitable mechanism.

Figure 3:
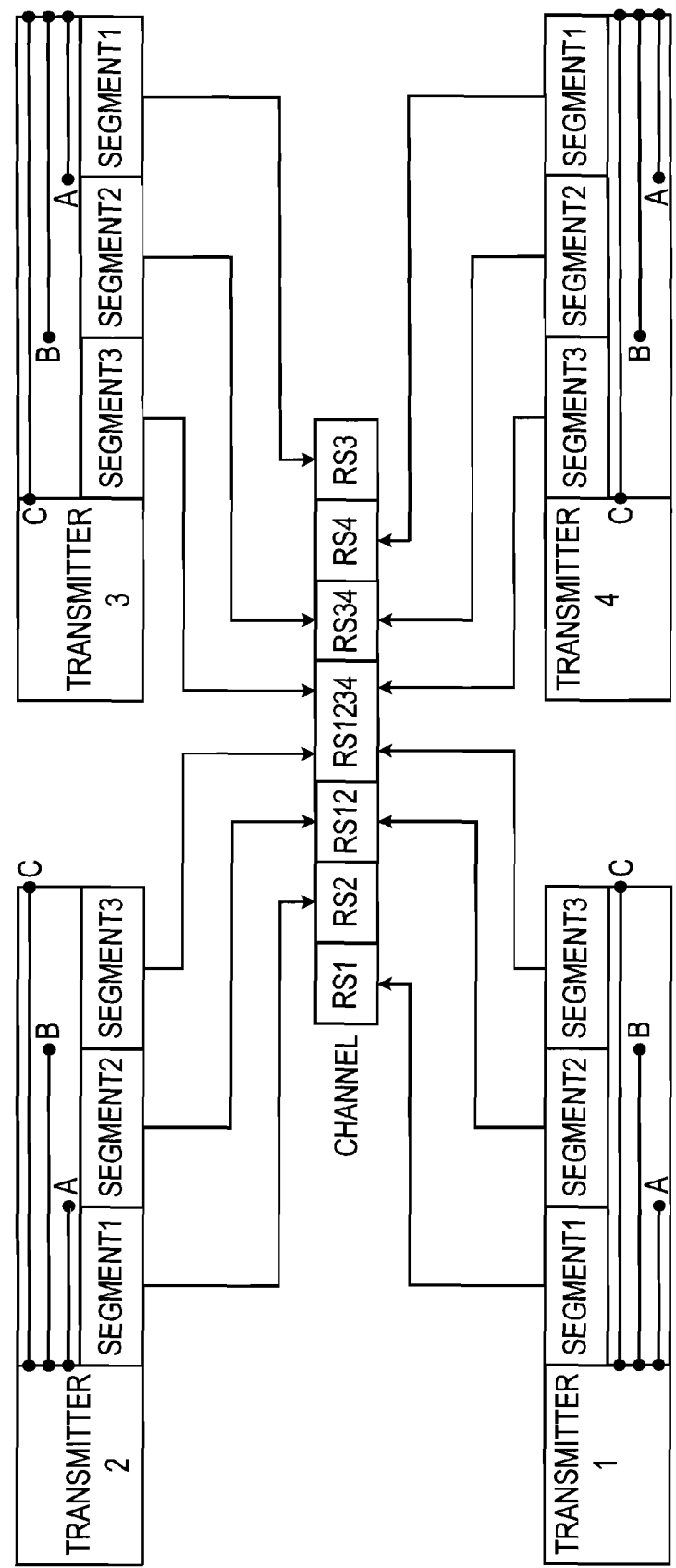
FIGS. 3-5 are diagrams that schematically illustrate channel resource allocation schemes, in accordance with example embodiments that are described herein.
Figure 4:
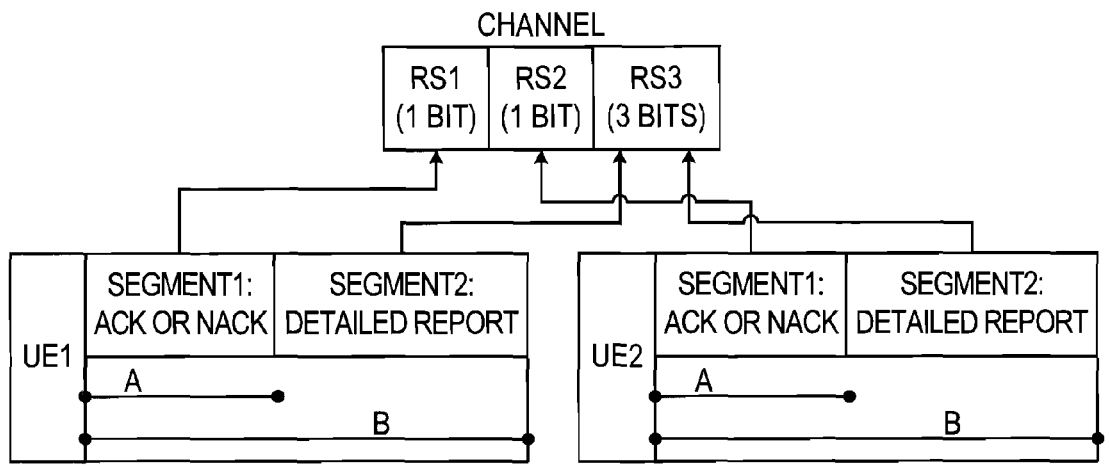
Figure 5:
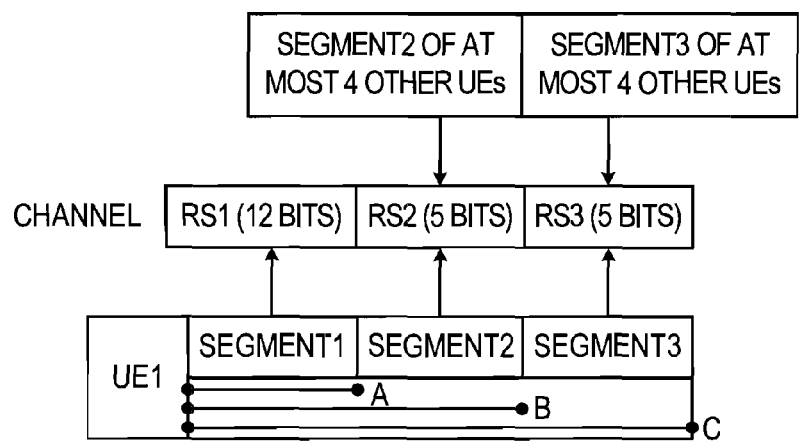

FIGS. 3-5 below illustrate several example resource allocation schemes that demonstrate the disclosed techniques and the performance improvement they provide. Note that the schemes of FIGS. 3-5 are given purely by way of example. In alternative embodiments, any other suitable resource allocation scheme can also be used.

In some embodiments, the resource allocation scheme is constrained in time. In other words, each UE can wait for no more than a limited time period before selecting and transmitting its uplink feedback message. In these embodiments, the resource allocation for a given uplink transmission is defined over some bounded amount of information that is available within the limited optimization time period.

In some embodiments, UEs 24 coordinate the uplink feedback transmission with one another. This sort of coordination enables the UEs to transmit on sparsely-used channel resources and attempt to avoid congested channel resources. In an example embodiment, a given UE obtains information regarding transmissions of other UEs, e.g., by listening to transmissions that are already in progress or using some feedback from the BS. The given UE configures its uplink transmissions based on this information.

FIG. 3 is a diagram that schematically illustrates a channel resource allocation scheme, in accordance with an embodiment. The present example illustrates four transmitters (e.g., UEs) denoted transmitter1 . . . transmitter4, which transmit over a communication channel to a destination receiver. Each transmitter selects its feedback message from a set of three possible messages denoted A, B and C. The messages are partitioned into a maximum of three segments denoted segment1 . . . segment3.

Message A is the shortest message and the most probable to occur, and it occupies only segment1. In other words, when a given transmitter selects message A, it transmits only segment1 with this message. Message B is longer and less probable to occur than message A, and occupies both segment1 and segment2. Thus, when a given transmitter selects message B, it transmits segment1 and segment2 with this message. Message C is the longest and least probable message of the three, and occupies all three segments segment1 . . . segment3.

In the embodiment of FIG. 3, a total of seven channel resources are allocated to the four transmitters. The allocation of the channel resources to message segments is listed in the following table:

TABLE 1

Example segment allocation

| Channel resource | Allocated segments |
|---|---|
| RS1 | segment1 of transmitter1 |
| RS2 | Segment1 of transmitter2 |
| RS12 | Segment2 of transmitter1 AND Segment2 of transmitter2 |
| RS1234 | Segment3 of transmitter1 AND Segment3 of transmitter2 AND Segment3 of transmitter3 AND Segment3 of transmitter4 |
| RS34 | Segment2 of transmitter3 AND Segment2 of transmitter4 |
| RS4 | segment1 of transmitter4 |
| RS3 | segment1 of transmitter3 |

The table defines how the different transmitters transmit the feedback messages they select. For example, if transmitter1 selects message B, it transmits this message in segments segment1 and segment2 on resources RS1 and RS12. If transmitter3 selects message A, it transmits this message in segment1 on resource RS3.

As can be seen in the figure, the channel resources potentially have different sizes. In the present example, the channel resources used for segment1 (RS1, RS2, RS3 and RS4) potentially differ in size from the channel resources used for segment2 (RS12 and RS34), and resource RS1234 also potentially has a different size.

In this embodiment, each transmitter is allocated a respective dedicated resource for transmitting segment1. Therefore, message A (which is the most commonly-occurring message) cannot collide with any other message. For transmitting segment2, transmitter1 and transmitter2 share a common resource (RS12) and transmitter3 and transmitter4 share a common resource (RS34). Thus, for example, if transmitter1 and transmitter2 select message B or C for transmission, segment2 of the two messages will suffer from collision and possible loss. Since messages B and C occur more rarely than message A, the impact of the collision may be tolerable.

Proper design typically ensures that the probability of losing segment2 is sufficiently low. Moreover, in some embodiments message B is designed such that segment1 is still decodable and usable even if segment2 is lost. The third segment, segment3, of all four transmitters is allocated the same resource RS1234. Thus, if more than one transmitter selects message C for transmission, segment3 of these messages may be lost. Since message C is relatively rare, this event is typically very rare and therefore tolerable.

As explained above, in some embodiments the transmitters transmit inter-segment signaling. In an example embodiment, the transmitters indicate in segment1 whether segment2 is transmitted or not, and in segment1 or segment2 whether segment3 is transmitted or not.

FIG. 4 is a diagram that schematically illustrates a channel resource allocation scheme, in accordance with another embodiment. The present example illustrates two UEs denoted UE1 and UE2 that transmit feedback messages to a BS. The BS and UEs use a HARQ mechanism, in which the UEs send acknowledgement (ACK) and negative acknowledgments (NACK) messages that indicate whether certain downlink packets were received properly.

In the present example, the feedback messages pertain to a group of three downlink packets. Each UE selects its feedback messages from a set of two possible message types denoted A and B. Message A is transmitted when all three downlink packets are received properly, and occupies segment1 only. The value transmitted in segment1 is denoted ACK. Message B (also referred to as NACK) is transmitted when one or more of the three downlink packets are not received properly, and occupies both segment1 and segment2. When message B is transmitted, a NACK value is transmitted in segment1, and a detailed NACK report (i.e., an indication which downlink packet or packets failed) is transmitted in segment2.

In this example, the two transmitters are allocated three channel resources denoted RS1, RS2 and RS3. RS1 is allocated exclusively for transmitting segment1 of UE1, and RS2 is allocated exclusively for transmitting segment1 of UE2. RS3 is allocated for transmitting segment2 of UE1 as well as segment2 of UE2. Thus, messages of type A (transmitted over the dedicated resources allocated to segment1) will not be subject to collision.

Collisions are possible on RS3, i.e., for the detailed reports of the NACK messages (messages of type B) that are transmitted over segment2. In some embodiments, the BS is aware that collision occurred, since it decodes a NACK value from segment1 on both RS1 and RS2. For a downlink BLER of 10%, the probability of collision on RS3 (i.e., the probability that both UEs select message B) is $(1-0.9^3)^2 \approx 7\%$.

In the present example, if collision on RS3 occurs, the BS retransmits all three downlink packets. Assume, for the sake of example, that a collision on RS3 reduces the downlink throughput by 50% because of the retransmission. The overall reduction in downlink throughput is thus 7%·50%=3.5%. This small reduction in downlink throughput is achieved because the disclosed allocation scheme allocates a shared channel resource to segment2 of message B, which carries the less important and less probable feedback. The more important and more probable feedback (segment1 of both messages) is assigned dedicated channel resources. The term "important" in this context refers to the impact of segment loss on the downlink throughput.

In the present example, the disclosed allocation scheme uses a total of five bits (RS1, RS2 and RS3 combined), in comparison with six bits that would be needed for independent resource allocation for each UE. Thus, the disclosed allocation scheme increases bandwidth efficiency on the uplink.

Using a more formal calculation, the overall performance measure that should be maximized is given by:

$$\sum_{k_t^1=1}^{K_1} \sum_{k_t^2=1}^{K_2} \cdots \sum_{k_t^N=1}^{K_N} \prod_{s=1}^{N} p_{k_t^s}^s \qquad \text{Equation 1}$$

$$\sum_{k_r^1=1}^{K_1} \sum_{k_r^2=1}^{K_2} \cdots \sum_{k_r^N=1}^{K_N} \left[ \begin{array}{c} p\left(\{\hat{M}_{k_r^s}^s\}_{s=1}^N \mid \{M_{k_t^s}^s\}_{s=1}^N\right) \cdot \\ f\left(\{\hat{M}_{k_r^s}^s\}_{s=1}^N, \{M_{k_t^s}^s\}_{s=1}^N\right) \end{array} \right]$$

wherein $$p\left(\{\hat{M}_{k_r^s}^s\}_{s=1}^N \mid \{M_{k_t^s}^s\}_{s=1}^N\right)$$

denotes the probability that the messages $$\{\hat{M}_{k_r^s}^s\}_{s=1}^N$$

have been received, given that messages $$\{M_{k_t^s}^s\}_{s=1}^N$$

have been transmitted by the N transmitters, respectively.

For N=2, as in the example of FIG. 4, Equation 1 reduces to:

$$\sum_{k_t^1=1}^{K_1} \sum_{k_t^2=1}^{K_2} p_{k_t^1}^1 p_{k_t^2}^2 \sum_{k_r^1=1}^{K_1} \sum_{k_r^2=1}^{K_2} \left[ \begin{array}{c} p\left(\{\hat{M}_{k_r^1}^1, \hat{M}_{k_r^2}^2\} \mid \{M_{k_t^1}^1, M_{k_t^2}^2\}\right) \cdot \\ f\left(\{\hat{M}_{k_r^1}^1, \hat{M}_{k_r^2}^2\}, \{M_{k_t^1}^1, M_{k_t^2}^2\}\right) \end{array} \right] \qquad \text{Equation 2}$$

Let message A in the example of FIG. 4 be denoted $M_0^{1,2}$, wherein the superscript index refers to the two transmitters (UEs). Let $P_0^{1,2}$ denote the a-priori probability that message $M_0^{1,2}$ is transmitted, i.e., the probability that all three downlink packets are received properly. Thus, $P_0^{1,2}=0.9^3$.

Message B actually comprises a set of eight possible messages that are denoted, following the above notation, $M_1^{1,2}$, $M_2^{1,2}, \ldots, M_8^{1,2}$, depending on the content of the NACK report. Assume, for example, that message $M_8^{1,2}$ is the message indicating that all three downlink packets have failed.

The conditional probability function of Equation 2 is defined on every set of four messages (two transmitted messages and two received messages), giving a total of $8^4$ possible combinations, for example:

$$p(M_0^1, M_0^2 \mid M_0^1, M_0^2) = 1 \qquad \text{Equation 3}$$
$$p(M_0^1, M_3^2 \mid M_0^1, M_3^2) = 1$$
$$p(M_2^1, M_3^2 \mid M_2^1, M_3^2) = 0$$
$$p(M_8^1, M_8^2 \mid M_2^1, M_3^2) = 1$$

wherein in the last two examples both UEs transmit message B, and therefore the BS acts as if all three downlink packets have failed. Note that Equation 3 is valid regardless of the signaling conveyed in messages $M_2^1$ and $M_3^2$ (with the exception of all-ACKs and all-NACKS that have already been signaled by $M_0^{1,2}$ and $M_8^{1,2}$.

In the present example, the overall performance measure is defined, for each set of four messages, as the resulting downlink throughput relative to the maximum possible throughput that would be achieved if all the downlink packets were received properly.

Assume, for example, that message $M_2^{1,2}$ is the message indicating that one packet failed and two other packets were received properly (in some specific order). Assume also that message $M_3^{1,2}$ is the message indicating that two packets have failed and one packet was received properly (in some specific order). Using this notation, we get:

$$f(\{M_0^1, M_0^2\}\{M_0^1, M_0^2\}) = 100\% \quad \text{Equation 4}$$

$$f(\{M_0^1, M_3^2\}\{M_0^1, M_3^2\}) = \frac{100\% + 66.666\%}{2} = 83.333\%$$

$$f(\{M_2^1, M_3^2\}\{M_2^1, M_3^2\}) = \frac{83.333\% + 66.666\%}{2} = 75\%$$

$$f(\{M_8^1, M_8^2\}\{M_2^1, M_3^2\}) = \frac{50\% + 50\%}{2} = 50\%$$

Substituting these values in Equation 2 would give a value that is greater than 96.5%=100%-3.5%. The channel resource limitation in this example is five bits, as explained above. A delay constraint in this example is that each UE should report the three most recent downlink packets without waiting for additional downlink packets to arrive.

In an embodiment, the allocation scheme of FIG. 4 is used in a LTE or LTE-A system. In this embodiment, resources RS1 and RS2 comprise some Physical Uplink Control Channel (PUCCH) format 1 resources. RS3 comprises some PUCCH format 2 resource, which more than two UEs may share for transmitting their respective ACK/NACK feedback report.

In some embodiments, a UE may not be aware of the number of downlink packets that have been transmitted to it. In LTE, for example, a UE may miss a downlink grant message, and therefore may not be aware how many Physical Downlink Shared Channel (PDSCH) packets have actually been transmitted to it. In an example embodiment, the BS signals the number of actually-transmitted packets to the UE. In an alternative embodiment, the BS signals all the packets in a certain control packet (e.g., Physical Downlink Control Channel—PDCCH packet in LTE), or at least all the packets that are transmitted at the same time. In this embodiment, the UE either reports feedback regarding all the packets, or reports no feedback at all.

FIG. 5 is a diagram that schematically illustrates a channel resource allocation scheme, in accordance with yet another embodiment. This example demonstrates that as the number of downlink packets reported using the ACK/NACK mechanism increases, it is possible to increase resource sharing (and thus use less resources for uplink feedback) without significant reduction in downlink throughput.

The example of FIG. 5 pertains to multiple UEs that transmit uplink feedback to a BS. The figure shows the resource allocation for only one UE, denoted UE1, for the sake of clarity. Each UE sends ACK/NACK feedback for a group of twenty downlink packets using three messages denoted A, B and C. Each UE is assigned three segments denoted segment1 . . . segment3. Some segments are dedicated and thus collision-free, while others are shared.

In the pictured embodiment, message A is selected when the number of NACKs (i.e., the number of packets that were not received properly) is three or less. Message A is transmitted on segment1 and occupies twelve bits. The first bit is used for inter-segment signaling and is therefore zero when transmitting message A. The remaining eleven bits indicate which of the twenty packets failed.

Message B is selected when the number of NACKS is four or five. Message B is transmitted on both segment1 and segment2, and occupies a total of seventeen bits. The first bit in segment1 is used for inter-segment signaling and is therefore equal to one. The first bit in segment2 is also used for inter-segment signaling and is therefore equal to zero. The remaining fifteen bits indicate which of the twenty packets failed.

Message C is selected when the number of NACKS is six or more. Message C is transmitted on all three segments segment1, segment2 and segment3, and occupies a total of twenty-two bits. The first bit in segment1 and the first bit in segment2 are used for inter-segment signaling and are therefore equal to one. The remaining twenty bits indicate which of the twenty packets failed.

This specific resource allocation provides a good trade-off that decreases the probability of transmission of each message (and thus enabling more UEs to share resources), while limiting the overhead for inter-segment signaling. This scheme, however, is shown purely by way of example. Any other suitable allocation scheme can also be used.

In the present example, each UE is assigned a total of twenty-two bits, divided into the three segments as described above. For each UE, segment1 is allocated a dedicated resource that is not shared with any other UE and is therefore free of collisions. The second segment, segment2, is assigned a resource that is shared with segment2 of no more than four other UEs. The third segment, segment3, is assigned a resource that is shared with segment3 of no more than four other UEs. Note that, for a given UE, the UEs sharing its segment2 are typically different from the UEs that share its segment3.

Consider a scenario in which the system is fully loaded, and actually assigns the above-described channel resources to the maximum possible number of UEs. Assume that the BLER of the first transmissions in the system is 10%, that the BLER of the second transmission (first retransmission) is zero, and that all UEs report the ACK/NACK status of twenty downlink packets, as described above. Different downlink packets are assumed to be uncorrelated. In this scenario, each UE uses, on average $12+\lceil 5/5 \rceil+\lceil 5/5 \rceil=14$ bits for its respective ACK/NACK report. An independent ACK/NACK report for each downlink packet, without resource sharing using the disclosed technique, would have required twenty bits per UE. Sharing the RS2 and RS3 resources among more than five UEs would typically not reduce the average number of bits that are actually used by each UE.

In this example scenario, the probability that k downlink packets have failed is $$p(k) = \binom{20}{k} \cdot 0.1^k \cdot 0.9^{20-k}.$$

The probability that a given UE transmits message A (i.e., only segment1) is $P1=\Sigma_{k=0}^{3} p(k)=0.867$. The probability that a given UE transmits message B (i.e., segment1 and segment2) is $P2=\Sigma_{k=4}^{5} p(k)=0.1217$. Given that UE1 transmits message B, the probability of collision (i.e., the probability that at least one of the other four UEs that share RS2 transmits message B or C) is $P_C^B=1-P1^4=0.435$. Given that UE1 transmits message C, the probability of collision is $P_C^C=1-P1^4 \cdot (P1+P2)^4=0.46$.

If a collision occurs in this example, the BS is assumed to retransmit all twenty downlink packets. Therefore, the throughput that UE1 experiences is 20/2=10 packets per Transmission Time Interval (TTI). Considering the probabilities above, the average throughput that UE1 experiences is given by:

$$\sum_{k=0}^{20} p(k) \cdot \left(\left[p_C(k) \cdot \frac{20}{2}\right] + \left[(1-p_C(k)) \cdot \left(\frac{k}{2}+20-k\right)\right]\right) = 18.55\left[\frac{\text{packets}}{TTI}\right]$$

Equation 5 wherein the probability of collision for the feedback of UE1, given that k downlink packets failed, is:

$$p_C(k) = \begin{cases} 0, & k \leq 3 \\ P_C^B, & 4 \leq k \leq 5 \\ P_C^C, & 6 \leq k \end{cases}$$

Equation 6

If, on the other hand, the ACK/NACK reports were allocated collision-free resources, the throughput of UE1 would have been:

$$\sum_{k=0}^{20} p(k) \cdot \left(\frac{k}{2}+20-k\right) = 19\left[\frac{\text{packets}}{TTI}\right]$$

Equation 7

Thus, even for a fully-loaded system in which all the UEs actually report the first transmission of the twenty downlink packets, the reduction in throughput is only ~2.36%. This degradation is usually well worth the considerable saving of uplink resources.

Although the embodiments described herein refer mainly to ACK and NACK feedback messages, the disclosed techniques can be used with various other types of feedback messages that are indicative of channel conditions, such as, for example, Channel Quality Indicators (CQI), Precoding Matrix Indicators (PMI) or Rank Indicators (RI). Although the embodiments described herein mainly address feedback messages that are indicative of channel conditions, the methods and systems described herein can also be used for allocating resources to any other suitable type of messages that are transmitted from multiple transmitters to a common receiver. Generally, the disclosed techniques can be used in any system that is able to tolerate some degree of information loss, e.g., in allocating resources to signaling messages or scheduling requests.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method, comprising:
in a communication system in which multiple transmitters transmit respective control messages to a receiver over a control channel, allocating respective resources of the control channel to the control messages so as to cause a respective likelihood of interference between a control message and at least one other control message to be inversely related to a respective impact of the interference between the control message and the at least one other control message on an overall performance measure defined for the communication system, by allocating a dedicated resource to a first control message for which the interference has a high impact on the overall performance measure, and allocating a shared resource to a second control message for which the interference has a low impact on the overall performance measure; and
transmitting the control messages from the transmitters over the control channel using the allocated resources.

2. The method according to claim 1, wherein transmitting the control messages comprises transmitting feedback indicative of the control channel, and wherein the overall performance measure comprises a performance of the communication system after optimization based on the feedback.

3. The method according to claim 1, wherein allocating the resources comprises causing, for each control message, a respective probability of collision between the control message and the at least one other control message to depend on the respective impact of the collision on the overall performance measure.

4. The method according to claim 1, wherein allocating the resources comprises:
allocating to a first control message for which the interference has a high impact on the overall performance measure a first resource that is shared among a first number of the transmitters; and
allocating to a second control message for which the interference has a low impact on the overall performance measure a second resource that is shared among a second number of the transmitters, larger than the first number.

5. The method according to claim 1, wherein allocating the resources comprises assigning the resources depending on respective occurrence probabilities of the control messages.

6. The method according to claim 1, wherein allocating the resources comprises assigning the resources depending on respective importance measures of the control messages.

7. The method according to claim 1, wherein allocating the resources comprises setting, for a given control message, at least one transmission parameter selected from a group of parameters comprising a transmit power, a modulation scheme, a coding scheme and a processing gain used for transmitting the given control message.

8. The method according to claim 1, wherein allocating the resources comprises assigning the resources for the control messages that are available for transmission within a limited optimization time period.

9. The method according to claim 1, wherein allocating the resources comprises coordinating allocation of the resources among the transmitters.

10. The method according to claim 1, wherein allocating the resources comprises segmenting each of at least some of the control messages into multiple individually-decodable segments, and allocating the resources to the respective segments.

11. The method according to claim 10, wherein transmitting the control messages comprises signaling an indication of the transmitted segments to the receiver.

12. The method according to claim 10, wherein segmenting the control messages comprises signaling in a given segment whether a subsequent segment is to be transmitted.

13. A transmitter in a communication system in which multiple transmitters transmit respective control messages to a receiver over a control channel, the transmitter comprising:
 a processor, which is configured to allocate a resource of the control channel to a control message to be transmitted from the transmitter, so as to cause a likelihood of interference between the control message and at least one other control message transmitted by at least one other transmitter to be inversely related to a respective impact of the interference between the control message and the at least one other control message on an overall performance measure defined for the communication system, by allocating a dedicated resource to a first control message for which the interference has a high impact on the overall performance measure, and allocating a shared resource to a second control message for which the interference has a low impact on the overall performance measure; and
 transmission circuitry, which is configured to transmit the control message over the control channel using the allocated resources.

14. The transmitter according to claim 13, wherein the processor is configured to transmit in the control message feedback indicative of the control channel, and wherein the overall performance measure comprises a performance of the communication system after optimization based on the feedback.

15. The transmitter according to claim 13, wherein the processor is configured to allocate the resources so as to cause, for each control message, a respective probability of collision between the control message and the at least one other control message to depend on the respective impact of the collision on the overall performance measure.

16. A mobile communication terminal comprising the transmitter of claim 13.

17. A chipset for processing signals in a mobile communication terminal, comprising the transmitter of claim 13.

18. A communication system, comprising:
 a receiver, which is configured to receive control messages over a control channel; and
 multiple transmitters, each transmitter configured to allocate a respective resource of the control channel to a respective message to be transmitted by the transmitter, so as to cause a respective likelihood of interference between the message and at least one other message transmitted by at least one other transmitter to be inversely related to a respective impact of the interference between the message and the at least one other message on an overall performance measure defined for the communication system, by allocating a dedicated resource to a first control message for which the interference has a high impact on the overall performance measure, and allocating a shared resource to a second control message for which the interference has a low impact on the overall performance measure, and to transmit the message to the receiver over the control channel using the allocated resource.

19. The system according to claim 18, wherein the transmitters are configured to allocate to a first control message for which the interference has a high impact on the overall performance measure a first resource that is shared among a first number of the transmitters, and to allocate to a second control message for which the interference has a low impact on the overall performance measure a second resource that is shared among a second number of the transmitters, larger than the first number.

* * * * *